J. SACHAR.
COMBINED CARRIAGE AND SLED.
APPLICATION FILED APR. 25, 1916.
1,200,033.
Patented Oct. 3, 1916.
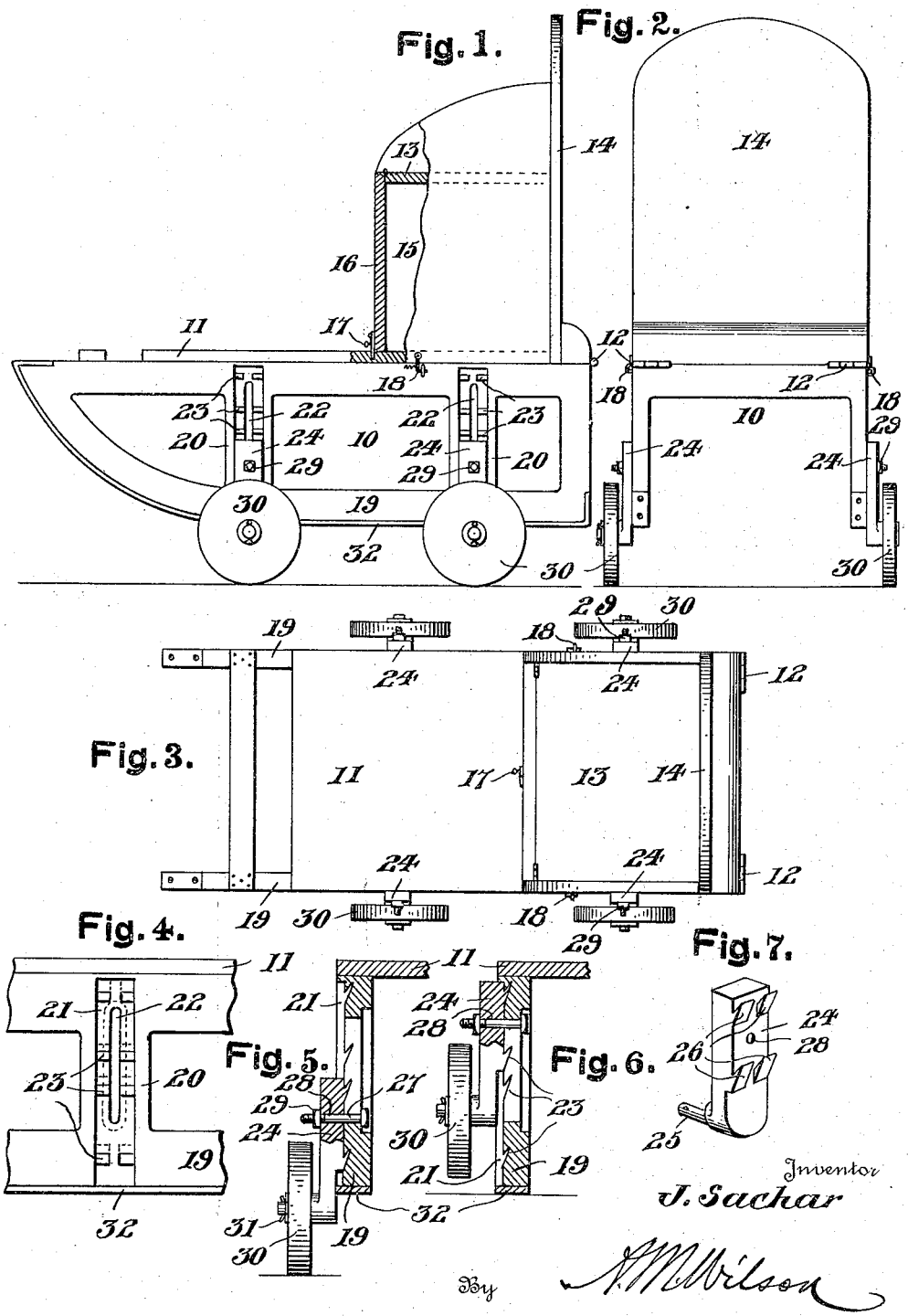

UNITED STATES PATENT OFFICE.

JOHN SACHAR, OF KATO, PENNSYLVANIA, ASSIGNOR OF ONE-HALF TO ANTONINE ULANITZKI, OF RAMEY, PENNSYLVANIA.

COMBINED CARRIAGE AND SLED.

1,200,033. Specification of Letters Patent. Patented Oct. 3, 1916.

Application filed April 25, 1916. Serial No. 93,473.

*To all whom it may concern:*

Be it known that I, JOHN SACHAR, a subject of the Emperor of Austria-Hungary, residing at Kato, in the county of Center and State of Pennsylvania, have invented certain new and useful Improvements in Combined Carriages and Sleds, of which the following is a specification.

This invention relates to new and useful improvements in combined carriage and sled.

The primary object of the present invention is the provision of a wheel attachment for a sled whereby the latter may be employed in the absence of snow and ice, an accommodating casing being arranged for the wheel members when not in use.

A further object of the device is to provide a sled having a seat carried upon the hinged top thereof and adapted for storing wheel members therein, the elevating of the top upon its hinges being adapted for allowing the ready application of the wheels to their operative positions upon the sled runners.

A still further object of the device is to provide removable wheel journaling brackets having interengaging connections with the sides of a sled whereby the same may be operatively and inoperatively positioned thereon at will.

With these general objects in view and others that will appear as the nature of the invention is better understood, the same consists in the novel combination and arrangement of parts hereinafter fully described, illustrated in the accompanying drawing and then claimed.

In the drawing forming a part of this application and in which like designating characters refer to corresponding parts throughout the several views:—Figure 1 is a side elevation of the device arranged as a vehicle partially broken away. Fig. 2 is a rear elevation thereof. Fig. 3 is a top plan view of the same. Fig. 4 is an enlarged elevational view of a side portion of the sled showing the wheel bracket receiving means. Fig. 5 is a vertical sectional view showing the adjustable attaching means for the wheels, one of the same being illustrated in its operative position. Fig. 6 is a view similar to Fig. 5 with a wheel arranged in its elevated inoperative position, and Fig. 7 is a perspective view of one of the wheel journaling brackets detached.

The present wheel attachment is adaptable for different forms of sleds but is herein illustrated in connection with a sled 10 having its top or deck 11 provided in the form of a board or plate hingedly connected as at 12 at the rear of the sled. A seat 13 is provided upon the rear end of the sled top 11 having a back 14, while a receiving chamber 15 is provided therein having a forwardly arranged closure door 16 provided with a spring pressed latch 17. The top 11 is maintained in flat engagement upon the sled 10 by means of oppositely arranged spring pressed hooks 18 by releasing which hooks the top 11 may be readily swung upwardly upon the hinges 12 allowing ready access to be had inwardly of the opposite side runners 19 of the sled. The said runners 19 are provided with upright legs or braces 20 having longitudinal receiving grooves 21 in their outer faces, the bottoms of which grooves are arranged with longitudinal slots 22 and with a series of upwardly inclined tapered receiving notches 23. Wheel supports in the form of journaling blocks 24 having stub axles 25 angularly projecting from the lower ends thereof are removably arranged adjustably within the said slots 21 being provided with inclined pairs of spaced teeth 26 adapted for reception within the said notches 23 at either the upper or lower adjustment of the block as illustrated respectively in Figs. 6 and 5 of the drawing. Retaining bolts 27 are secured through perforations 28 in the blocks 24 and through the aforementioned slots 22, the said bolts having lock nuts 29 arranged thereon. Ground engaging wheels 30 are journaled upon the axles 25 being retained thereon by suitable cotter pins 31.

From this detailed description of the device, it will be evident that one of the blocks 24 may be readily inserted in one of the grooves 21 and retained by means of one of the bolts 27 and its nut 29 in its elevated position as shown in Fig. 6 with the block teeth 26 arranged within the uppermost four notches 23. By releasing the nut 29 the block 24 may be lowered for positioning its lugs 26 within the lowermost four of said notches 23 as illustrated in Fig. 5, the nut 29 being then tightened for maintaining the wheel 30 downwardly projecting beneath the metal shoe 32 of the adjacent runner 19, the outer edge of which shoe then engages and braces the lower portion of the block 24, the shoe closing the lower end of the slot 21. The upward inclination of the lugs 26 and notches 23 affords a close supporting engagement therefor and provides a structure in which the wheel brackets are firmly mounted upon the sled runners for operative employment when the device is designed for use as a vehicle. The wheels are elevated as shown in Fig. 6 when the device is employed as a sled temporarily although when desired the blocks 24 and bolts 27 are entirely detached from the runners and stored away within the aforementioned chamber 15 of the vehicle seat 13.

A serviceable sled is thus provided which may be readily converted into a strong vehicle whenever desired, the device being simple and easy to manufacture although fulfilling all of the objects for which it is intended.

While the form of the invention herein shown and described is what is believed to be the preferred embodiment thereof, it is nevertheless to be understood that minor changes may be made in the form, proportion and details of construction without departing from the spirit and scope of the invention as hereinafter claimed.

What I claim as new is:—

A device of the class described comprising a sled having side runners arranged with metallic shoes thereon, the said runners being provided with vertical grooves arranged with longitudinal slots through the bottoms thereof and further having upwardly inclined tapered notches in the bottoms of the said grooves, bracket blocks shiftably arranged within the said grooves and having upwardly inclined tapered lugs arranged within corresponding ones of the said notches, securing bolts arranged through the said blocks and slots and ground wheels journaled upon the said blocks, the said blocks engaging the adjacent edges of the said shoes when operatively positioned thereabove when inoperatively arranged.

In testimony whereof I affix my signature.

JOHN SACHAR.

Copies of this patent may be obtained for five cents each, by addressing the "Commissioner of Patents, Washington, D. C."